C. RYAN.
MEASURING DEVICE FOR CUTTING GARMENTS.
APPLICATION FILED MAR. 25, 1911.
1,004,593.
Patented Oct. 3, 1911.
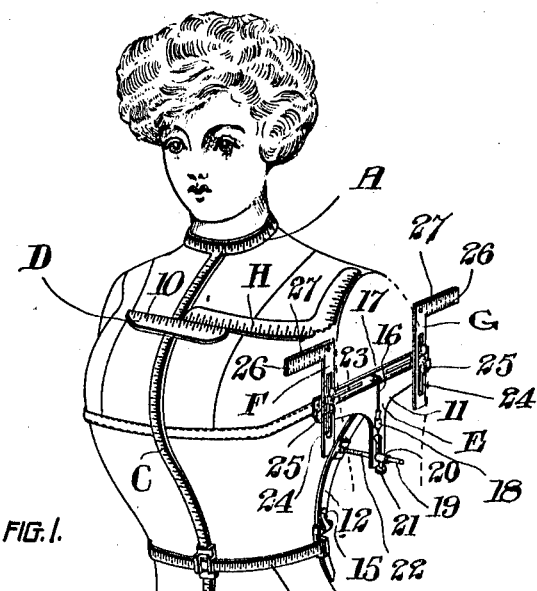
FIG. 1.
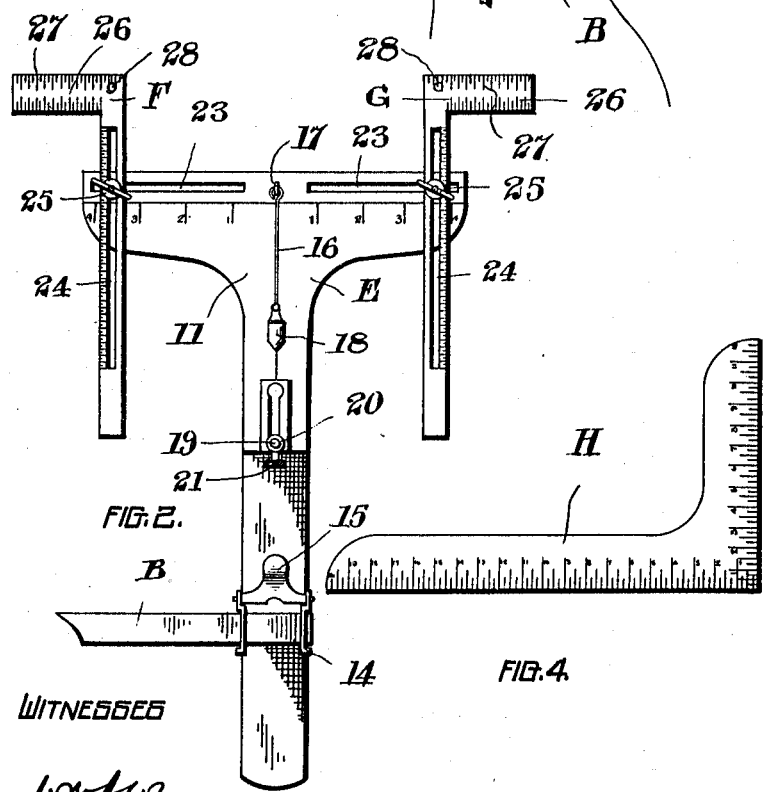
FIG. 2.
FIG. 4.
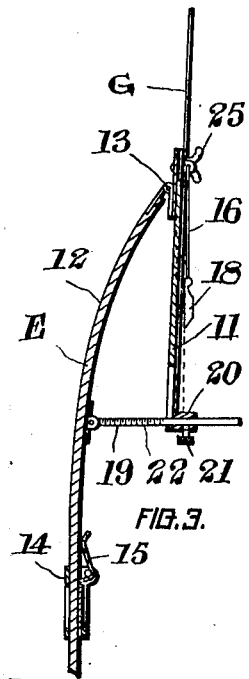
FIG. 3.
WITNESSES
INVENTOR
C. RYAN
BY
ATT'Y.

UNITED STATES PATENT OFFICE.

CATHERINE RYAN, OF OTTAWA, ONTARIO, CANADA.

MEASURING DEVICE FOR CUTTING GARMENTS.

1,004,593.   Specification of Letters Patent.   Patented Oct. 3, 1911.

Application filed March 25, 1911. Serial No. 616,949.

*To all whom it may concern:*

Be it known that I, CATHERINE RYAN, of 74 O'Connor street, city of Ottawa, Province of Ontario, Dominion of Canada, have invented certain new and useful Improvements in Measuring Devices for Cutting Garments, of which the following is a specification.

My invention relates to improvements in measuring devices for cutting garments, and the objects of my invention are to enable a more accurate measure to be taken of the person's figure who is being fitted, and to enable the measurments to be taken from an exactly vertical or plumb standard.

Many inaccuracies at present occur in taking measurements for cutting garments such as waists, coats, vests, etc., owing to the fact that no standard is provided from which the measurements are taken, that is to say, the measurements are all taken on the person's figure, the curving contour of which causes inaccuracies to appear when the measurements are applied to cut the garments on a flat surface. It is proposed to remedy this defect in the present invention by providing in combination with the usual measuring means, a standard measuring element, having a plumb line incorporated therewith whereby it may be caused to assume an exactly vertical position from which the measurements may be taken.

Further objects of my invention are to enable the measurements to be taken in both directions from said standard elements and to enable the device to be adjusted to a variety of different sizes, the details of the invention and the manner of constructing the same being hereinafter more fully set forth and described in the accompanying specification and drawings.

In the drawings: Figure 1 is a perspective view of the invention in use. Fig. 2 is an elevation of the standard measuring element. Fig. 3 is a sectional detail through the same. Fig. 4 is a plan of an L-square which may be used in connection with the invention.

In the drawings like characters and figures of reference indicate corresponding parts in all the figures.

The invention comprises essentially a measuring means adapted to conform to the figure, and plumb line or standard measuring means adapted normally to occupy a substantially vertical position.

The measuring means adapted to conform to the figure comprise a neck band A, a waist band B and connecting tapes C extending between on the front and back. Slidably mounted on the front tape is a transversely extending and stiff scale D, having a straight and substantial horizontal extending upper edge 10. The standard or plumb line measuring means E are adapted to fit beneath the arm of the person being measured and comprise a T-square 11 adapted to remain in a vertical position, and a flexible element 12 adapted to conform to the figure. The T-square is pivotally supported from the flexible element and in the embodiment illustrated a hinged connection 13 is formed at the upper extremity of the flexible element.

The flexible element which may be of leather, whalebone, steel or any material which will conform to the figure has slidable connection at its lower end with the waist band E, the form of connection being such that both a vertical and horizontal adjustment may take place, and means are also provided to clamp the flexible element in the position to which it is adjusted vertically. It will be noted that this flexible element, owing to the nature of the material of which it is constructed, is practically longitudinally rigid, although it is laterally flexible. It is consequently adapted to form a support for the T-square and is to be distinguished from an ordinary tape which would not possess longitudinal rigidity.

As illustrated, a bracket member 14 forms the connection and the flexible element is adapted to be clamped by a pivoted locking lever 15 on the bracket member.

Means are provided for plumb lining the T-square 11.

These means, as illustrated, comprise a thin wire 16 pivoted at the upper extremity to an eyelet 17 on the T-square, and having a weight 18 at its lower extremity. It will be seen that when the T-square is in vertical position the wire 16 will lie closely against the same.

Means are provided for holding the T-square in its vertical position with respect to the flexible member 12. The means, which I have devised comprise a rod 19 pivoted to the flexible member and extending through a sleeve 20 on the T-square, and which has a locking set screw 21 extending therethrough. It will be seen that the distance along the rod 19 forms a measure of the curvatures of the figure beneath the arm, and to permit the ready measurement of this a scale 22 may be formed on the rod 19.

In order to measure the contour of the front and back of the figure to be measured, outwardly and vertically adjustable elements F and C are carried by the T-square. The form of element preferred is an L-square as shown, and the adjustment is secured by providing horizontally extending slots 23 in the arms of the T-squares and vertically extending slots 24 in the L-squares which cross each other, the L-squares being held in adjustable position by clamping thumb nuts and bolts 25, each extending through both the slots 23 and 24. The short section 26 of the L-squares are at the top and turn outwardly, and may be formed with scales 27 to be used as hereinafter described.

Having now pointed out the various parts of my device, the method of operation of the same may be briefly described:—The neck and waist bands are first adjusted in position, and the tapes C are also adjusted until they fit closely to the figure at the center of the front and back. The element E is then placed beneath the arm and moved upwardly until the edge of the T-square will fit beneath the armpit. The flexible element 12 is conformed to the figure, and the L-square is swung outwardly until it assumes a substantially vertical position which is ascertained by the fact that in such position it will be substantially parallel with the plumb line 16. The elements F and G are then adjusted outwardly and vertically until they fit closely to opposite sides of the shoulder at substantially the center thereof. They are then secured in position by suitable means, such as a pin or stitch inserted through suitable perforations 28 which may be provided on the elements for that purpose. The device is then in position to enable the necessary measurements to be taken to ascertain the exact contour of the figure. These measurements are taken by the scale on the tapes, and other elements, and by means of a flexible L-square and a stiff L-square, each having the form shown in Fig. 4. The L-square H illustrated is flexible and may be formed for example of leather. By means of it, it is possible to measure the distance around the figure from the tape C to the inner edge of the square F. With the stiff L-square placed along the edge 10 it is possible to measure the distance between the tape C and the scale 26 when the square is placed at right angles to the scale and also to measure the point on the scale 27 at which the stiff square will strike. It will thus be seen, that by this means, the measurements of a triangle are given, whose sides are the distance along the surface of the figure, the distance along a line from the tape C to the square F at right angles to the latter, and the distance along the square. This forms a very accurate measure of the outward curve of the figure from the armpit to the center of the chest.

The measurements of the distance which the scale D is below the neck band, and outwardly on the square F will give an accurate measure of the outward curve, while the curve of the figure beneath the arm-pit is accurately given by the scale 19.

The application of the invention to obtain other measurements of the figure will be apparent to dressmakers, tailors and others skilled in the art to which the invention appertains. The description of the use given above has been applied only to the measurements of the front of the figure but it is quite apparent that the measurements in the back would be taken in an exactly similar manner.

It will be seen that the present invention provides a rapid and accurate means for taking a series of measurements which are all related to a vertical standard measuring element, namely, the T-square 11. It will be found that the possession of measurements in this form will very materially facilitate the laying out, and cutting of the garments on the cutting table.

It will be seen that the rod 19 in addition to serving as a scale, braces the members apart, and as the arm naturally bears against the T-square 11 it will press the member 12 against the side and thus help to retain it in position.

As many changes could be made in the above construction and many apparently widely different embodiments of my invention within the scope of the claims constructed without departing from the spirit or scope thereof, it is intended that all matter contained in the accompanying specifications and drawings shall be interpreted as illustrative and not in a limiting sense.

What I claim as my invention is:

1. In a measuring device and in combination, a longitudinally rigid and laterally flexible measuring element adapted to conform to the figure, and a standard rigid measuring element connected thereto having a plumb wire and a weight thereon pivoted to one side thereof.

2. In a measuring device and in combination, a flexible measuring element adapted to fit beneath the arm-pit and conform to the figure, and a T-square hinged thereto and an adjustable measuring element on the arm of the T-square and adapted to fit on opposite sides of the shoulder.

3. In a measuring device, and in combination, a T-square adapted to fit beneath the shoulder of the wearer, an outwardly and upwardly adjustable measuring square carried by the extremity of the arm of the T-square and a laterally flexible, longitudinally rigid element hinged to the T-square.

4. In a measuring device, and in combination, a measuring element adapted to fit beneath the armpit and to assume a substantially vertical position, a second element connected to the first and adapted to conform to the figure between the arm pit and the waist and means for measuring the angle between the elements.

5. In a measuring device, and in combination, a pair of elements adapted to fit beneath the arm-pit one of which is adapted to remain in a vertical position and the other to conform to the figure, a rod pivoted to one member and a sleeve on the other member embracing the rod and having a set screw extending therethrough.

6. In a measuring device, and in combination, a pair of elements hinged together and both adapted to fit beneath the armpit, one of said elements being adapted to assume a vertical position and having a plumb-line associated therewith and the other being adapted to conform to the figure between the arm pit and the waist.

7. In a measuring device, a pair of elements connected together and adapted to fit beneath the arm-pit; one of said elements being adapted to fit to the figure between the armpit and the waist, while the other remains in a vertical position, and means for indicating when the said last mentioned element is in exactly vertical position.

8. In a measuring device, and in combination, a measuring element adapted to fit beneath the arm-pit and having a vertical adjustable measuring square thereon with an outwardly extending arm a horizontal guide, means for supporting the same on the bosom of the person being measured and means for measuring the distance the horizontal square lies outwardly from the arm of the adjustable measuring square.

9. In a measuring device and in combination a T-square adapted to fit beneath the arm-pit, a pair of measuring squares adjustably connected to the arms of the T-squares and adapted to fit on opposite sides of the shoulder.

10. In a measuring device, and in combination, a T-square adapted to fit beneath the armpit and having slots in the arms thereof, a pair of L-squares having longitudinally, extending slots adapted to extend across the slots in the T-square and clamping means extending through the slots in the T-square and L-squares.

11. In a measuring device, and in combination, a measuring element adapted to fit beneath the arm-pit and having transversely extending slots on opposite sides; measuring elements on each side of the first mentioned element, and having longitudinally extending slots therein, and clamping means connecting both elements and extending through the slots in each.

12. In a measuring device and in combination, a neck-band, a waist band, and a tape connecting the neck band and waist band, a horizontal measuring scale adjustably mounted on the tape adapted to extend across the bosom of the wearer, a flexible measuring element fitting beneath the armpit and being conformed to the figure from the arm pit to the waist; a vertical extending measuring element connected to the flexible element and carrying adjustable members adapted to fit on opposite sides of the shoulders said members being adapted to coöperate with the horizontal scale in measuring the distance that said scale lies outwardly from the arm pit.

13. In a measuring device, and in combination, a neck band, a waist band a tape connecting the same, and a scale horizontally mounted on the tape, a flexible element extending upwardly from the waistband beneath the arm-pit and a vertically extending element connected to the flexible element and carrying an L-square adapted to fit against the shoulders and having an arm extending outwardly.

In witness whereof I have hereunto set my hand in the presence of two witnesses.

CATHERINE RYAN.

Witnesses:
 RUSSEL B. SMART,
 JAS. C. RITCHIE.

---

Copies of this patent may be obtained for five cents each, by addressing the "Commissioner of Patents, Washington, D. C."